United States Patent
Matsui

(10) Patent No.: US 10,642,425 B2
(45) Date of Patent: May 5, 2020

(54) IMAGE DISPLAY DEVICE INCLUDING A TOUCH SWITCH

(71) Applicant: Sharp Kabushiki Kaisha, Osaka (JP)

(72) Inventor: Kuniaki Matsui, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 39 days.

(21) Appl. No.: 15/205,226

(22) Filed: Jul. 8, 2016

(65) Prior Publication Data

US 2017/0010718 A1   Jan. 12, 2017

(30) Foreign Application Priority Data

Jul. 10, 2015 (JP) ................................. 2015-138806

(51) Int. Cl.
  *G06F 3/044*   (2006.01)

(52) U.S. Cl.
  CPC .... *G06F 3/044* (2013.01); *G06F 2203/04105* (2013.01)

(58) Field of Classification Search
  CPC . G06F 2203/04105; G06F 2203/04107; G06F 2203/04111; G06F 2203/04112; G06F 3/044; H01L 21/447
  See application file for complete search history.

(56) References Cited

U.S. PATENT DOCUMENTS

| | | | |
|---|---|---|---|
| 5,917,165 A | 6/1999 | Platt | |
| 7,511,242 B2* | 3/2009 | Winkler | H03K 17/962 200/511 |
| 2009/0019949 A1 | 1/2009 | Rothkopf | |
| 2011/0079502 A1 | 4/2011 | Kraus | |
| 2012/0050201 A1* | 3/2012 | Nozawa | G06F 3/045 345/173 |
| 2015/0185911 A1* | 7/2015 | Kim | G06F 3/044 349/12 |
| 2016/0188031 A1* | 6/2016 | Wang | G06F 3/044 345/174 |

FOREIGN PATENT DOCUMENTS

| | | |
|---|---|---|
| JP | H10-241491 A | 9/1998 |
| JP | 2011-082166 A | 4/2001 |
| JP | 2013-106308 A | 5/2013 |

OTHER PUBLICATIONS

Japanese Office Action for corresponding Application No. 2015-138806, dated Jan. 15, 2019.

* cited by examiner

*Primary Examiner* — Ram A Mistry
(74) *Attorney, Agent, or Firm* — Renner, Otto, Boisselle & Sklar, LLP

(57) ABSTRACT

An image display device comprising a capacitive touch switch that performs switching by detecting a finger based on a change in capacitance that is caused when the finger comes close to a panel, wherein the touch switch comprises the panel, a substrate on which an electrode for detecting capacitance is mounted, and a conductive member corresponding to the electrode, and the conductive member is provided between the panel and the electrode, and is fixed by being interposed between the panel and the electrode.

6 Claims, 13 Drawing Sheets

FIG. 12
(A)
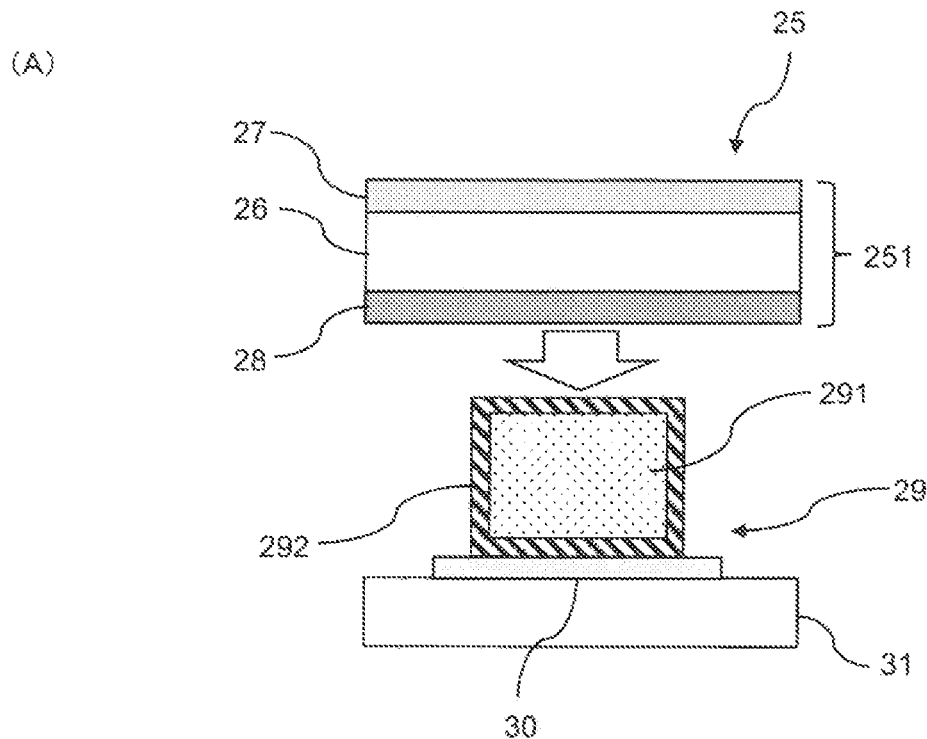
(B)
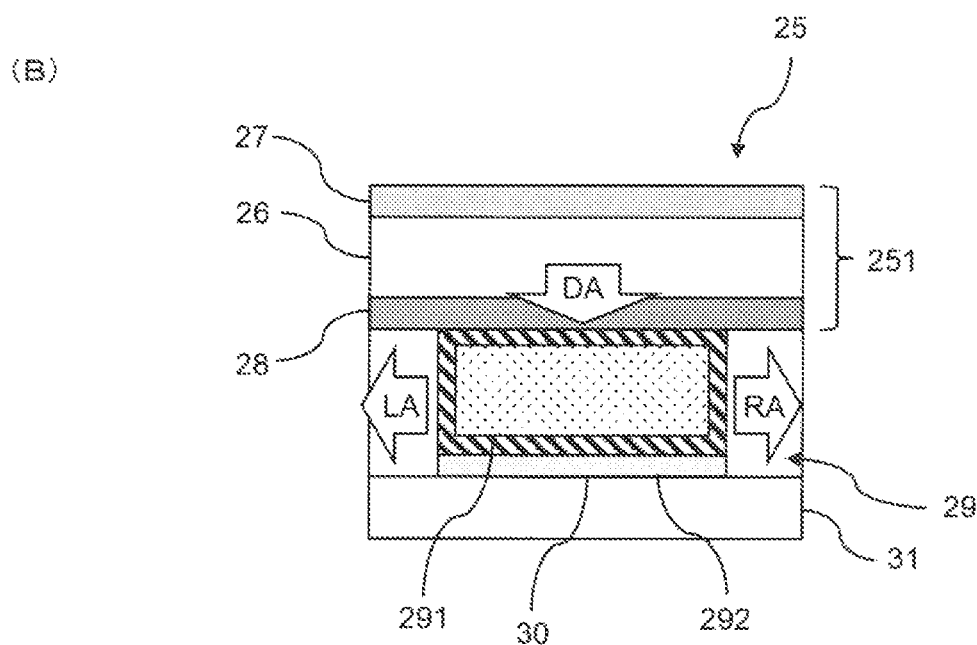

FIG. 15
(A)
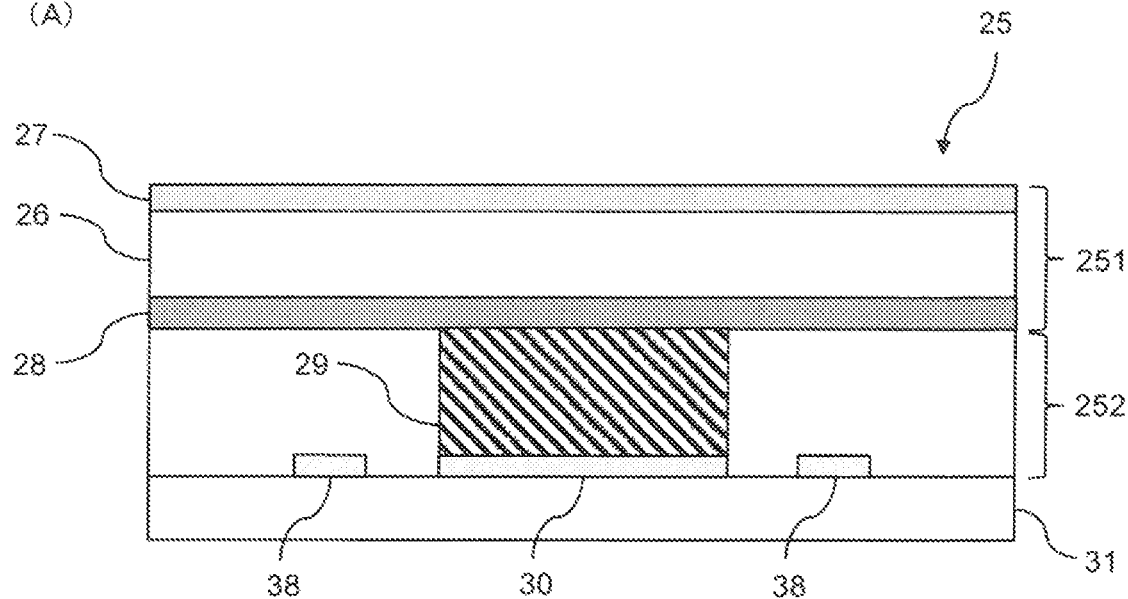
(B)
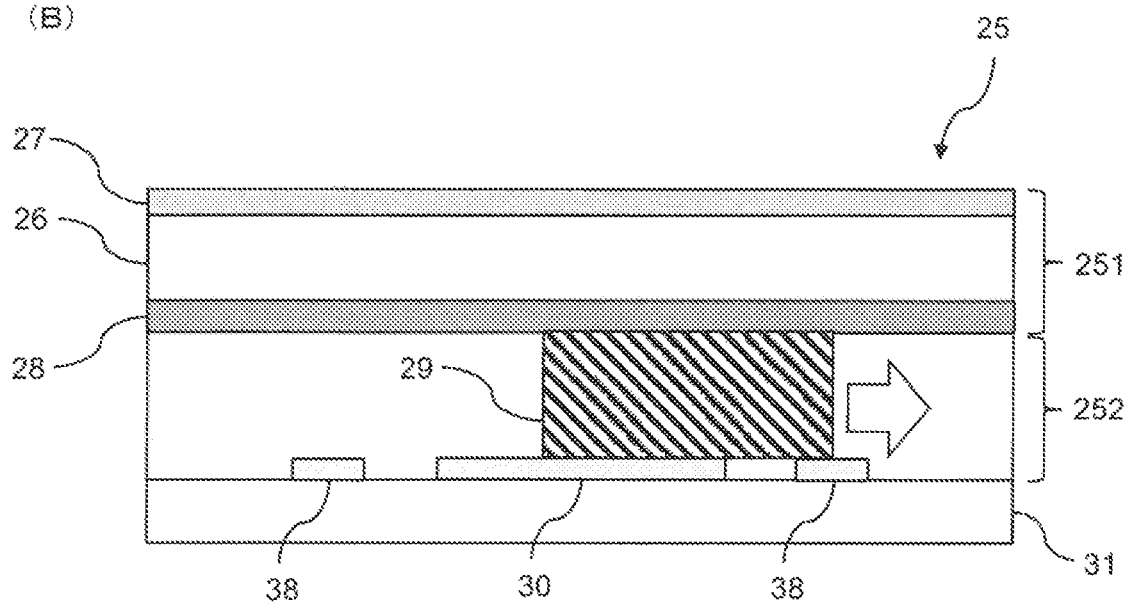

FIG. 16
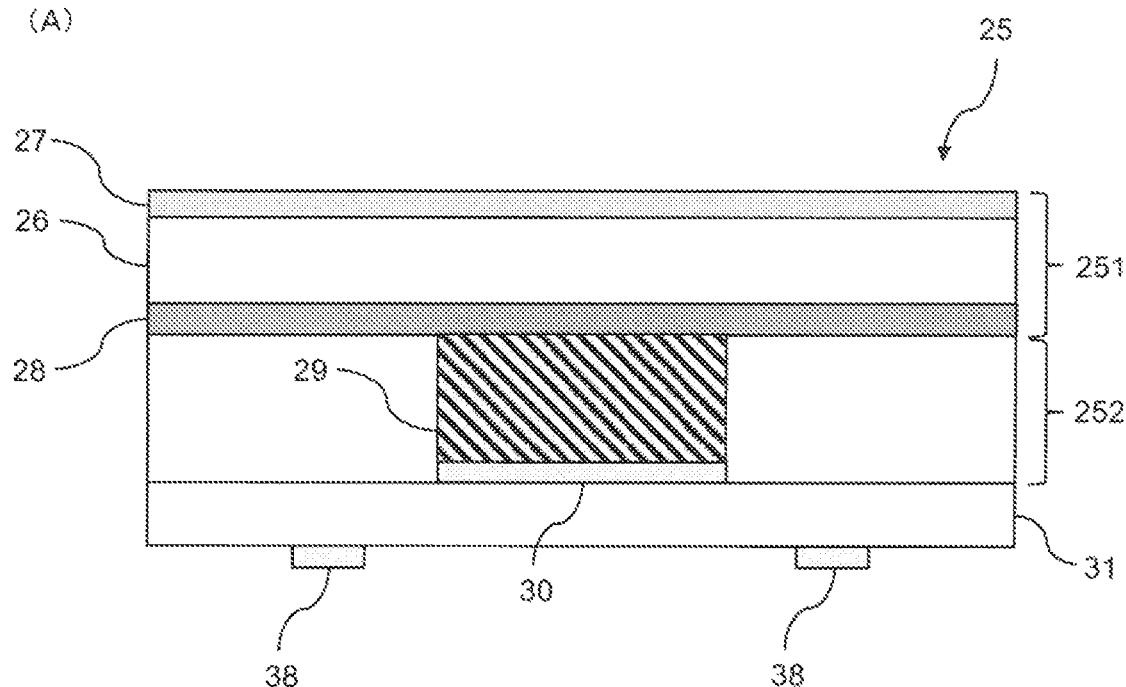
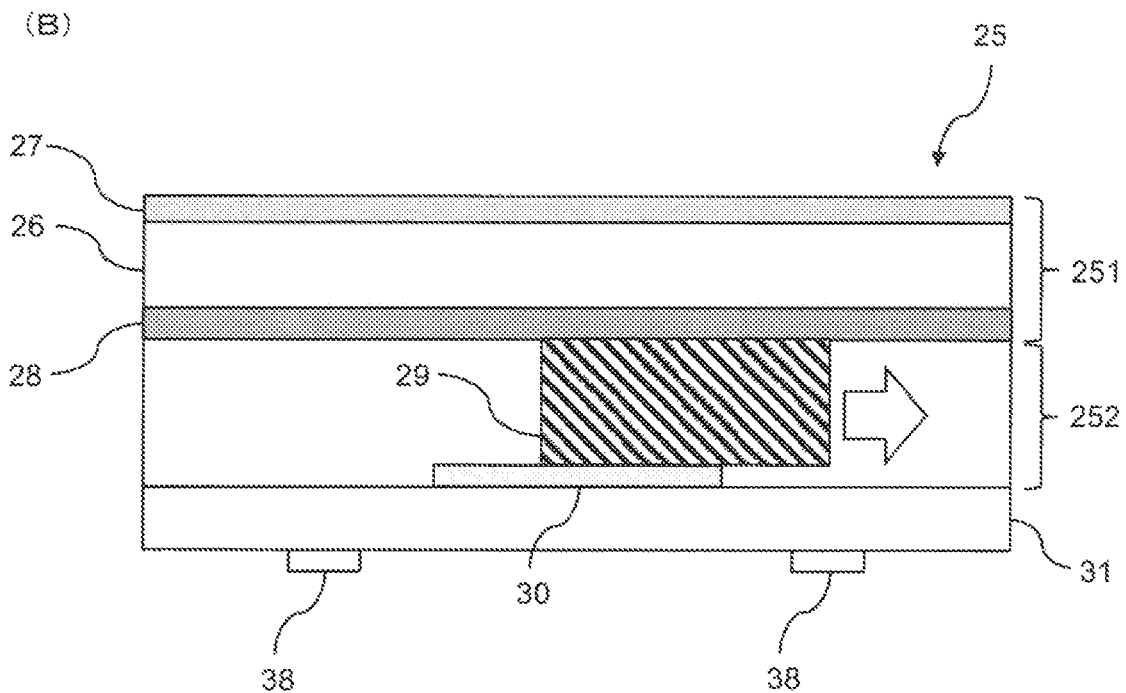

IMAGE DISPLAY DEVICE INCLUDING A TOUCH SWITCH

BACKGROUND OF THE INVENTION

Field of the Invention

The present invention relates to an image display device, and more particularly, to a full-flat image display device provided with a touch switch.

Description of the Related Art

In recent years, as image display devices, there are known full-flat image display devices whose display screen and frame are integrated. Compared to a conventional image display device whose display screen and frame are separated, a full-flat image display device is superior in design due to its sense of unity and the part of the frame is not conspicuous thanks to the sense of unity, and when the image display devices are arranged next to each other, viewers get an impression that the image display devices are smoothly connected. Therefore, a market demand for full-flat image display devices is on the increase.

To realize a touch panel of a full-flat image display device, a capacitive touch panel is desirable, which is operated based on a change in capacitance that is caused when a fingertip or the like comes close to known glass, by using a method of detecting a touch on the glass (for example, see JP 2013-106308 A).

Furthermore, in recent years, there is a trend to increase a size of a screen of an image display device, and a large screen is also demanded for a full-flat image display device. In the case of a large-screen image display device, in order to secure a strength, glass on the whole surface of a display screen is possibly made very thick, and for example, in the case of art 80-inch display, a thickness of 3 mm or more is required.

Accordingly, to provide a mechanical operation button to a frame part of a large-screen foil-flat image display device, a hole needs to be made to thick, large glass, and there are problems that processing is not easy and the cost is high.

It is conceivable to provide a capacitive touch switch to the frame, instead of a mechanical operation button, but in this case, an area of a capacitance detection, sheet for detecting a change in capacitance has to be spread to the frame part.

However, normally, a capacitance detection sheet is made according to a size of a display screen, and cannot be used for a power switch or the like positioned at the frame part outside the display screen. Also, in the case of using a capacitance detection sheet which is larger than the display screen, the frame part spreads also to parts other than a part where a power switch or the like is disposed, and thus the design is impaired, and a problem is caused at a time when a multi-screen is structured by combining a plurality of image display devices next to one another. Also, there is a problem that ordering a capacitance detection sheet which is not in accordance with a size of a display screen increases burden of cost.

It is also conceivable to configure a touch panel and switch by connecting a plurality of small-area capacitance detection sheets, but in this case, components other than the small-area capacitance detection sheets, such as cable wires for connecting the capacitance detection sheets, become necessary, and there are problems that burden of cost is increased, and also, that assembly efficiency is deteriorated.

SUMMARY OF THE INVENTION

The present invention has been made in view of the above, and has its aim to provide an inexpensive and easily assembled full-flat image display-device including a capacitive touch switch.

An image display device including a capacitive touch switch that performs switching by detecting a finger based on a change in capacitance that is caused when the linger comes close to a panel, where the touch switch includes the panel, a substrate on which an electrode for detecting capacitance is mounted, and a conductive member corresponding to the electrode, and where the conductive member is fixed by being interposed between, the panel and the electrode.

According to the present invention, an inexpensive and easily assembled full-flat image display device including a capacitive touch switch may be realized. Also, even if components for an electrode are not separately provided, it is enough if an electrode is formed on a substrate on which a control circuit is mounted, while using a conductive member which is thicker than the component mounted on the substrate.

BRIEF DESCRIPTION OF THE DRAWINGS

FIG. 12 is an explanatory diagram showing an example of installation of the conductive member shown in FIG. 11 on the touch switch;

FIG. 15 is an explanatory diagram showing problems caused by providing the GND pattern inside the touch switch;

FIG. 16 is an explanatory diagrams showing a structure of the touch switch according to the fourth embodiment.

DETAILED DESCRIPTION OF THE PREFERRED EMBODIMENTS

Hereinafter, the present invention will be described in detail with reference to the drawings. Additionally, the description below is only an example in every aspect, and should be understood not to limit the present invention.

First Embodiment

<Configuration of Image Display Device 100>

In the following, a configuration of an image display device 100, provided with a touch switch 25, according to a first embodiment of the present invention will be described with reference to FIGS. 1 to 4.

Figure 1:
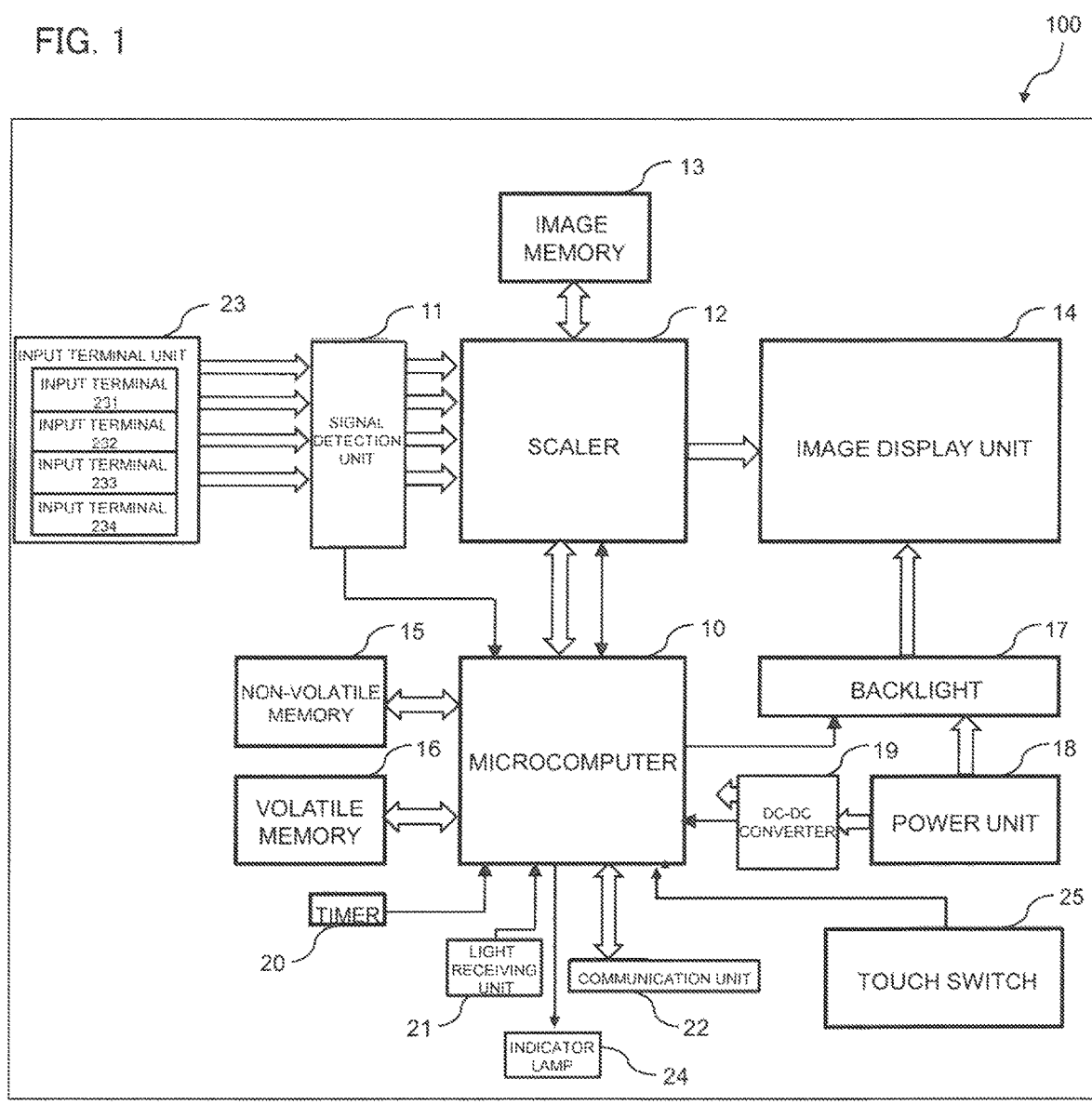
FIG. 1 is a block diagram showing a schematic configuration of the image display device of the present invention.
Figure 2:
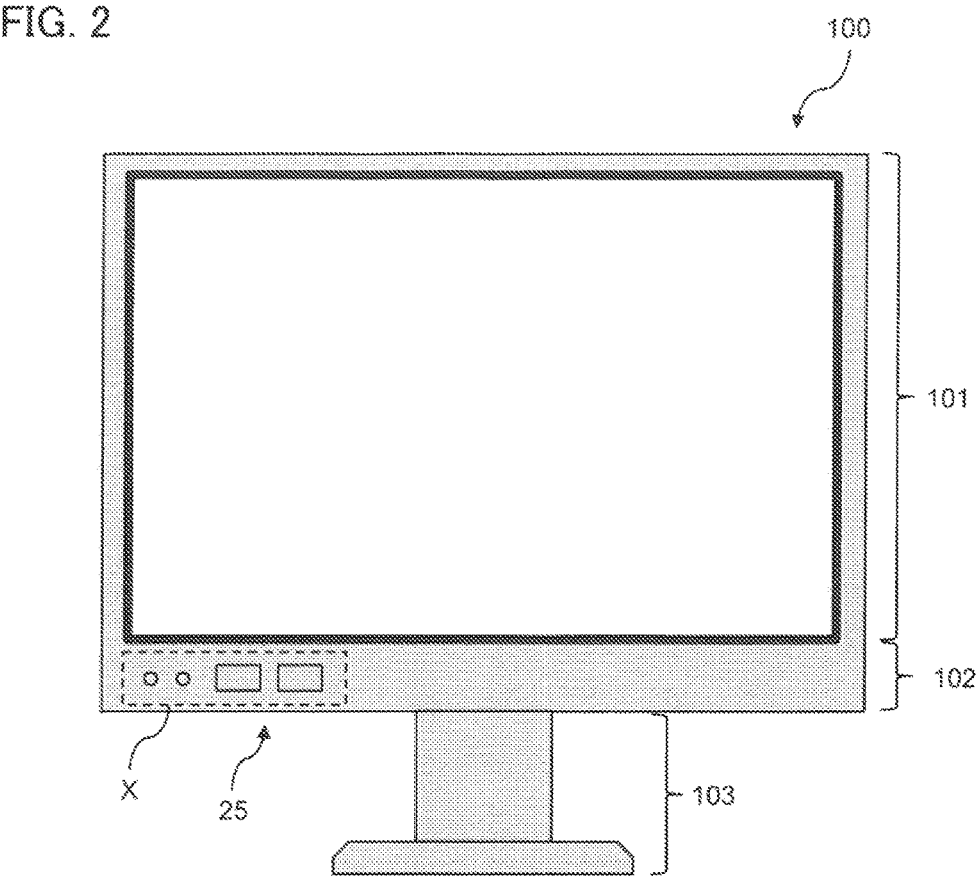
FIG. 2 is a front view of the image display device of the present invention.
Figure 3:
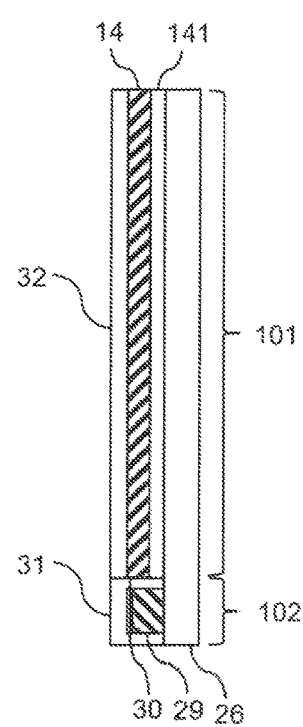
FIG. 3 is a left side view of a display unit, and an operation unit shown in FIG. 2.
Figure 4:
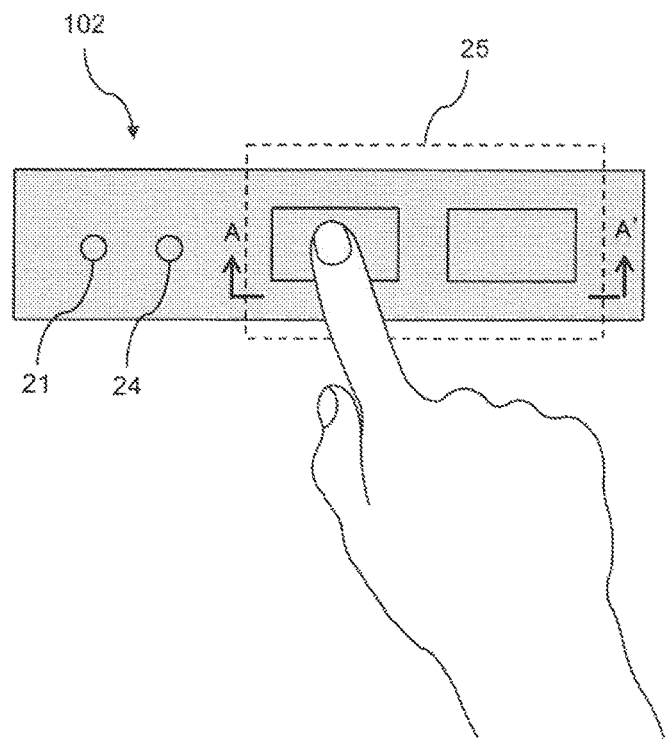
FIG. 4 is an enlarged view of a part X of the operation unit shown in FIG. 2.

FIG. 1 is a block diagram showing a schematic configuration of the image display device 100 of the present invention. FIG. 2 is a front view of the image display device 100 of the present invention. FIG. 3 is a left side view of a display unit 101 and an operation, unit 102 shown in FIG. 2. FIG. 4 is an enlarged view of a part X of the operation unit 102 shown in FIG. 2.

The image display device 100 is a device for displaying an image/video, such as a moving image, a still image or a 3D image, and includes a touch panel which is operated by touching a screen with a fingertip or the like, and a touch switch for performing an operation for turning on or off power or for displaying a menu screen, based on a touch with a fingertip or the like on an operation panel, for example.

As the image display device 100, there may be cited a display of a television, a personal computer (PC), a public display, a monitor, an electronic blackboard, or the like.

Furthermore, the image display device 100 is not limited to a stationary image display device, and may be a portable image display device such as a smartphone or a tablet terminal.

As shown in FIG. 1, the image display device 100 of the present. Invention mainly includes a microcomputer 10, a signal detection unit 11, a scaler 12, an image memory 13, an image display unit 14, a non-volatile memory 15, a volatile memory 16, a backlight 17, a power unit 18, a DC-DC converter 19, a timer 20, a light receiving unit 21, a communication unit 22, an input terminal, unit 23, an indicator lamp 24, and a touch switch 25.

In the following, each structural element shown, in FIG. 1 will be described.

The microcomputer 10 is a circuit mainly constituted of a microprocessor, and is an arithmetic device that performs a process of controlling various devices, and processing of an operating system, application software and the like. Also, an ASIC (Application Specific Integrated Circuit), which is an integrated circuit designed and fabricated for a specific purpose, or a circuit having other arithmetic functions may be included as a peripheral circuit.

The signal detection unit 11 is a part for detecting input signals input from external devices, not shown, through input terminals 231 to 234.

Types of input signals include input signals for an analog input, terminal, such as a VGA terminal or a component terminal, for a digital input device such as a DVI terminal, an HDMI (registered trademark) terminal or a DisplayPort terminal, and for an input terminal of a control system, such as an USB connector.

Furthermore, input, signals wirelessly transmitted by Bluetooth (registered, trademark), a wireless LAN or the like may also be detected without being limited to detection of input signals transmitted by wire.

The scaler 12 is apart for processing image data for example, processes such as image correction, color correction, γ correction, double speed processing, OSD generation, and OSD superimposition are performed.

The image memory 13 is a part for storing image data processed by the scaler 12. For example, it is used for FRC (Frame Rate Conversion).

The image display unit 14 is a part for displaying various pieces of information, such as an input image and a setup screen 140.

Furthermore, a display surface of the image display unit 14 is covered by a touch panel, and a touch panel operation is allowed by detecting a position of a fingertip or the like of a user contacting the display surface. As a position detection method of the touch panel a capacitive method of detecting a change in the capacitance caused by a finger coming close to the panel is used.

Additionally, as the display panel of the image display unit 14, glass 26, which is shared with the touch switch 25, is used (see FIG. 3).

The non-volatile memory 15 is a part for storing information necessary to realize various functions of the image display device 100, such as static text of control programs, log information, user setup information and system information. As the non-volatile memory 15, a storage medium such as a flash memory or an EEPROM is used.

The volatile memory 16 is a part for temporarily storing various pieces of data mad exchange results. The volatile memory 16 is used also as a work area for programs. As the volatile memory 16, a semiconductor device such as an SRAM, or a storage medium such as a hard disk is used.

The backlight 17 is a part for illuminating liquid crystal from a back surface of the image display unit 14. As a light source of the backlight 17, an LED or a cold cathode fluorescent, lamp (CCFL) is used, for example. Moreover, a direct type, an edge light type and other types may be used.

The power unit 18 is a part for converting external AC power into DC power, and for supplying the power to each part of the image display device 100. As the power unit 18, an AT power supply, an ATX power supply, or an SFX power supply is used, for example.

The DC-DC converter 19 is a part for reducing or boosting the direct current input from the power unit 18, and for supplying necessary power to each part of the image display device 100.

The timer 20 is a part for measuring elapsed times of various processes by the image display device 100.

The light receiving unit 21 is a part for receiving an infrared (IR) signal from a remote control, and accepts an instruction from a user through reception of an infrared signal from the remote control.

The communication unit 22 is a part for performing communication with an external device in a wired or wireless manner over a network, and for transmitting/receiving data. As the network, a LAN, a wide area network (WAN) such as the Internet, a dedicated communication line or the like is used.

As wireless communication standards, Bluetooth (registered trademark), and IEEE802.11a, IEEE802.11b, IEEE802.11g and IEEE802.11n, which are wireless LAN standards, may be cited, for example.

As external devices as communication destinations, devices that are capable of performing communication in a wired or wireless manner, such as a PC, a mobile terminal, and a server, may be cited, and also, an RS-232C, which is a legacy interface, and the like are included.

The input terminal unit 23 is a part to which a terminal of an external device is connected and a signal is input.

The input terminal unit 23 shown in FIG. 1 includes four input terminals 231 to 234 which are capable of being connected to a terminal of an external device, hut this is only exemplary, and any number of input terminals may be included.

Terminals that can be connected to the input terminal unit 23 include an analog input terminal, such as a VGA terminal or a component terminal, a digital input device such as a DVI terminal, an HDMI terminal or a DisplayPort terminal, and an input terminal of a control system, such as an USB connector.

As the external devices, those capable of outputting signals of a moving image or a still image, such as a PC, a mobile terminal, a recorder, a video camera and the like, may be cited.

The indicator lamp 24 is a lamp for displaying a power state of the image display device 100 by an LED or the like. For example, when the power of the image display device 100 is off, a red LED is displayed, and when the power is on, a green LED is displayed.

The touch switch 25 is a part for accepting operations for turning on or off power, displaying a menu screen, and the like, with a capacitive touch switch.

The touch switch 25 accepts an operation when it is detected by an electrode 30 that capacitance caused by a touch of a fingertip or the like is at or above a predetermined threshold.

As shown in FIG. 2, the image display device 100 is mainly divided into three parts, namely, the display unit 101, the operation unit 102 and a support unit 103, and the touch switch 25 is provided to the operation unit 102.

In the following, the side of the Image display device 100 seen from the front, will be referred to as a front (or a front part), and the side of a rear face will be referred to as a back (or a back part).

As shown in FIG. 3, the display unit 101 and the operation unit 102 share the glass 26 as a shared panel.

At the display unit 101, a capacitance detection sheet 141, the image display unit 14, and a substrate 32 are provided in this order on a back surface of the glass 26.

Furthermore, at the operation unit 102, a conductive member 29, the electrode 30, and a substrate 31 are provided in this order on the back surface of the glass 26.

Additionally, the number of the substrate 31 is not limited to one, and it is also possible to mount a plurality of substrates.

As described above, although the glass 26 is shared, the substrate 32 of the display unit 101 and the substrate 31 of the operation unit 102 are independently provided, and thus maintenance, such as replacement of the touch switch 25, is facilitated.

As shown in FIG. 4, the operation unit 102 includes the light receiving unit 21, the indicator lamp 24, and the touch switch 25. A user performs an operation of turning on or off the power or of displaying a menu screen, for example, by touching a predetermined position on a glass surface of the touch switch 25 with a fingertip or the like.

A "substrate" of the present invention is realized by the substrate 31. Also, a "panel" of the present invention is realized by the glass 26.

<Configuration and Operation of Touch Switch 25>

Next, a configuration and operation of the touch switch 25 of the present invention will be described with reference to FIGS. 5 to 10.

Figure 5:
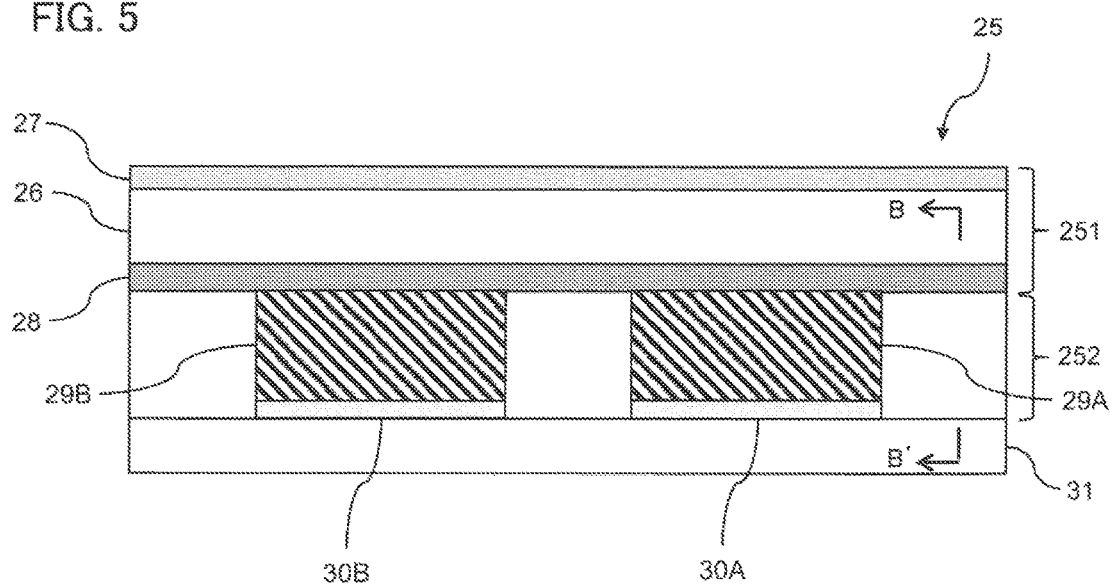
FIG. 5 is a cross-sectional view of the operation unit shown in FIG. 4, along a line A-A'.
Figure 6:
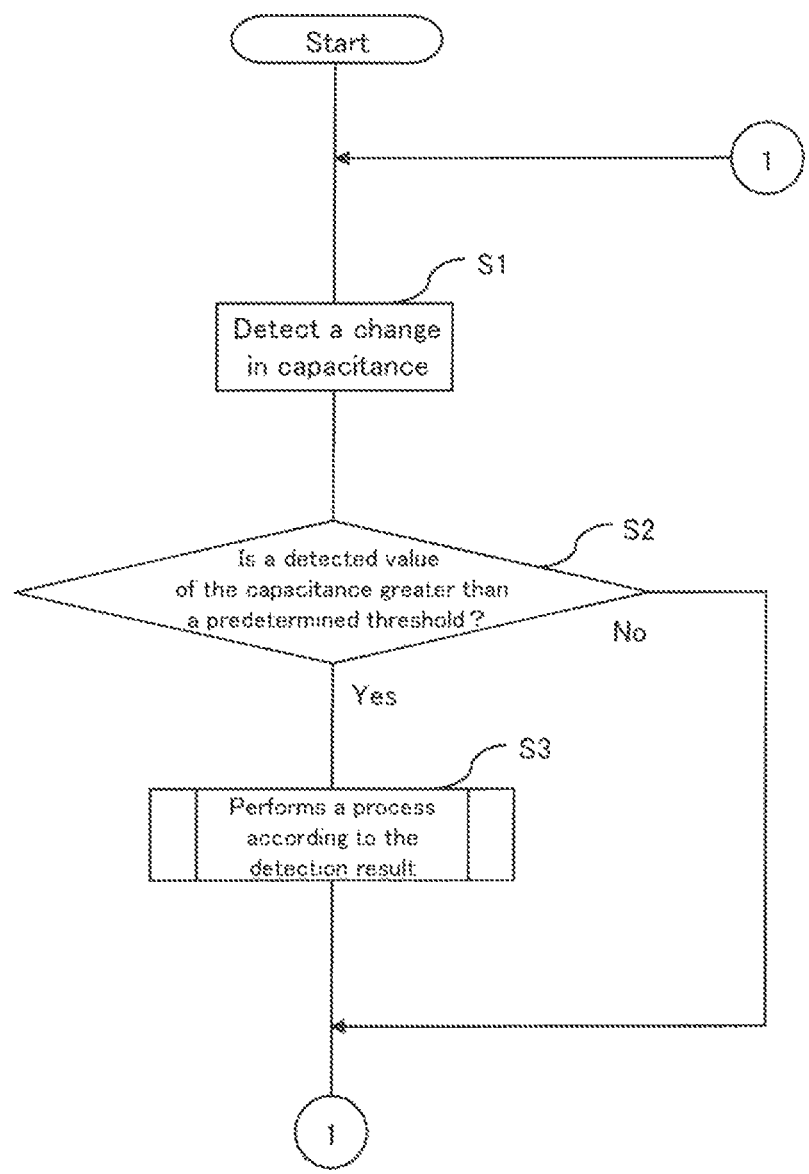
FIG. 6 is allow chart showing a procedure performed by the touch switch of the image display device of the present invention, for detecting capacitance.
Figure 7:
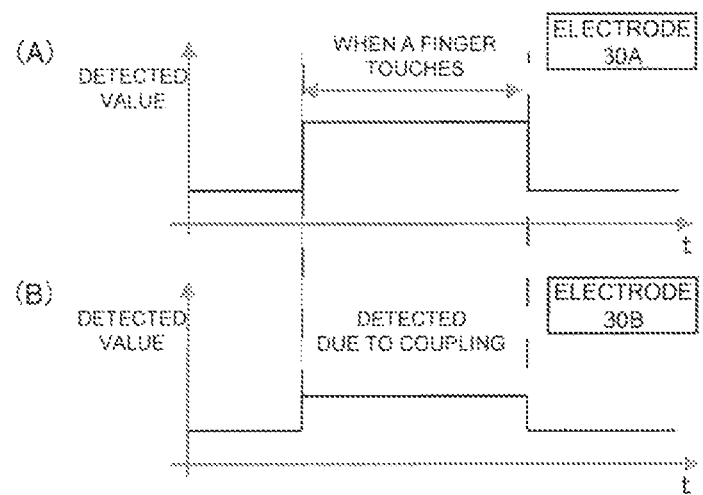
FIG. 7 is an explanatory diagram showing examples of a detected value of capacitance at an electrode of a conventional touch switch.
Figure 8:
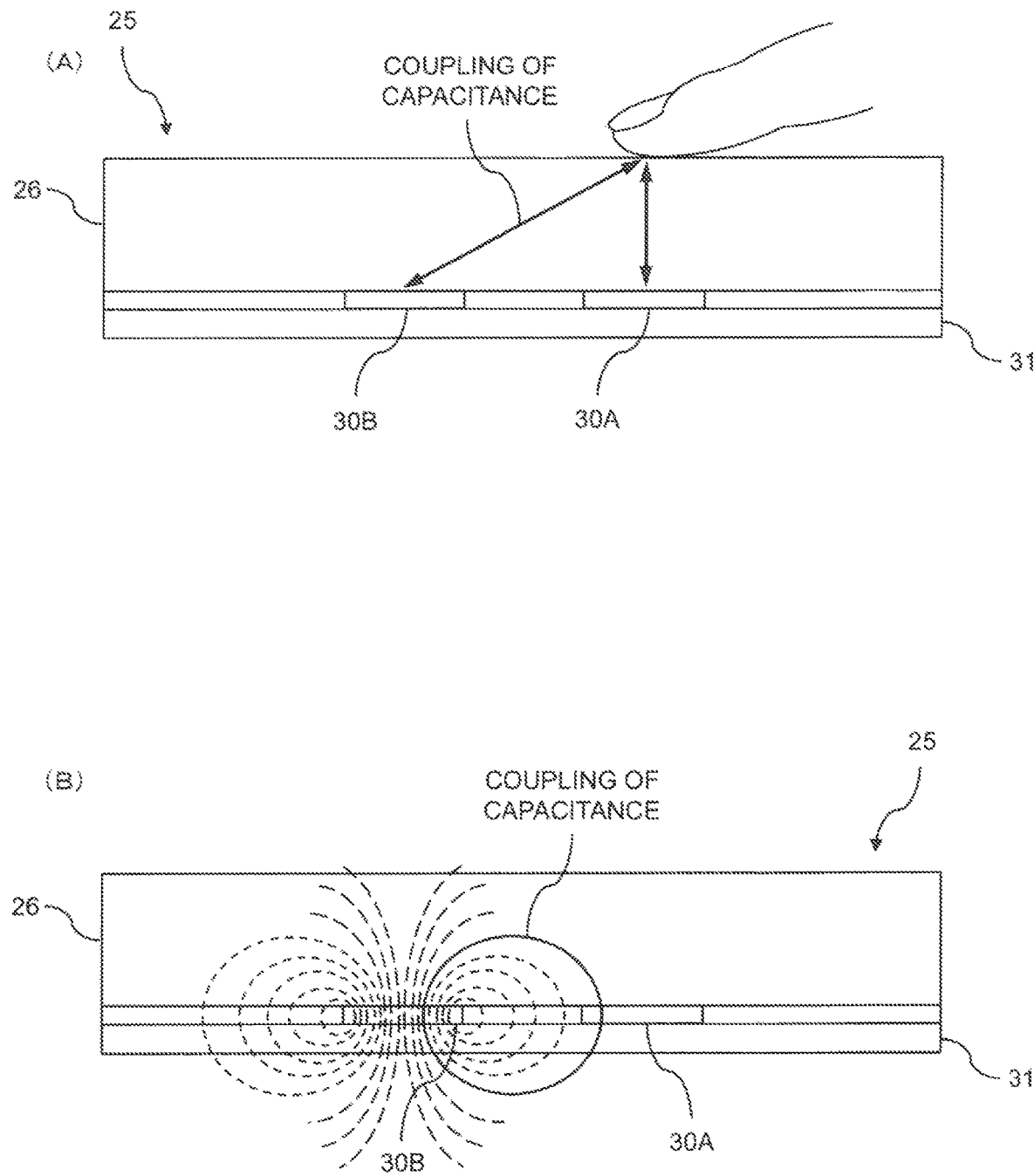
FIG. 8 is an explanatory diagram showing a mechanism which causes erroneous operations due to coupling of capacitance with a fingertip in a capacitive touch panel using large glass.
Figure 9:
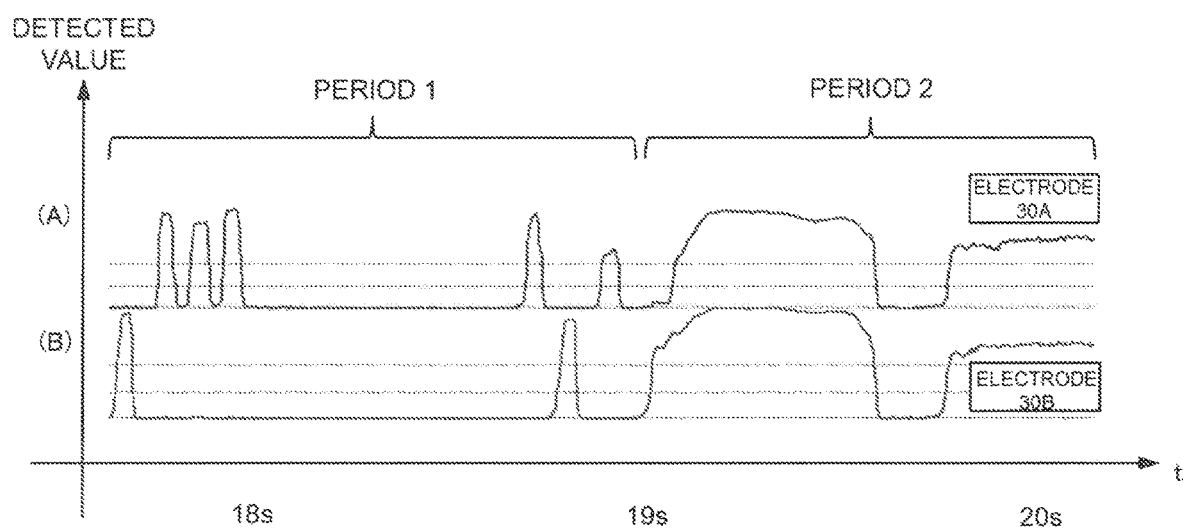
FIG. 9 shows graphs showing examples of a detected value of capacitance at the electrode of the touch switch of the present invention.
Figure 10:
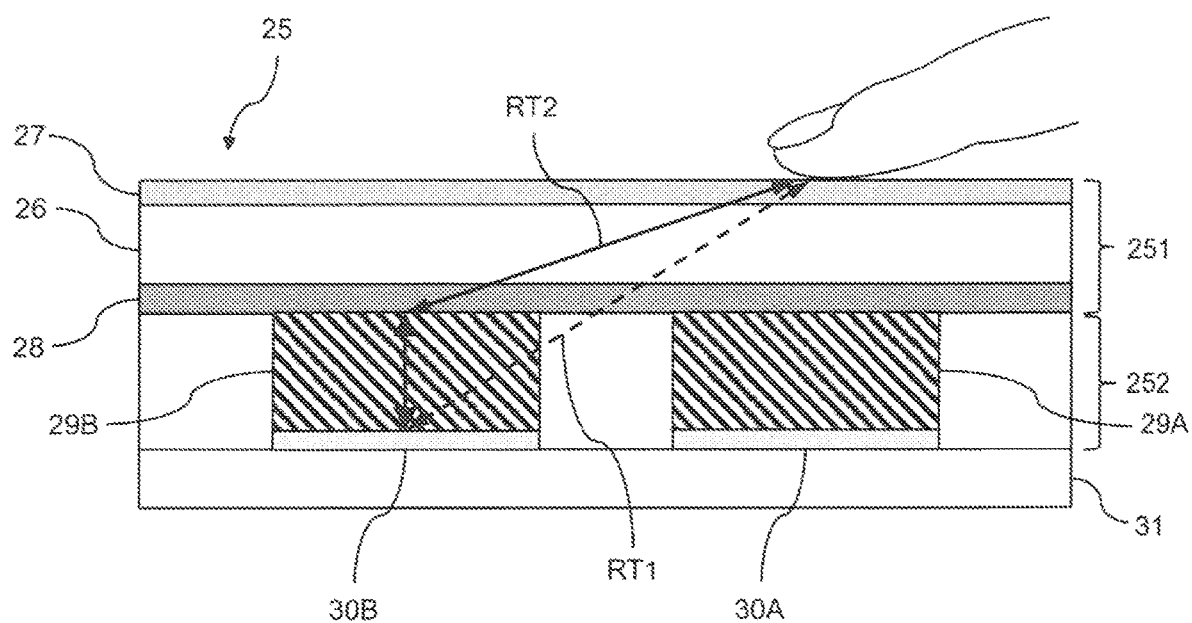
FIG. 10 is an explanatory diagram showing a reason why coupling of capacitance with an adjacent electrode of the touch switch of the present invention is reduced.

FIG. 5 is a cross-sectional view of the operation, unit 102 shown in FIG. 4, along a line A-A'. FIG. 6 is a flow chart showing a procedure performed by the touch switch 25 of the image display device 100 of the present invention, for detecting capacitance. FIG. 7 is an explanatory diagram showing examples of a detected value of capacitance at an electrode 30 of a conventional touch switch 25. FIG. 8 is an explanatory diagram showing a mechanism which causes erroneous operations due to coupling of capacitance with a fingertip in a capacitive touch panel using large glass. FIG. 9 shows graphs showing examples of a detected value of capacitance at the electrode 30 of the touch switch 25 of the present invention. FIG. 10 is an explanatory diagram showing a reason why coupling of capacitance with an adjacent electrode 30 of the touch switch 25 of the present invention is reduced.

As shown in FIG. 5, the touch switch 25 of the present invention is configured from an operation panel unit 251, an electrode unit 252, and the substrate 31.

An AG (Anti-Glare, antireflection) film 27, the glass 26, and ink 28 are provided to the operation panel unit 251 in this order from the front side. The ink 28 is a black ink, for example, and is applied to a back surface of the glass 26.

In this case, the AG film 27 has a thickness of 0.1 mm, the glass 26 has a thickness of 3.2 mm, and the ink 28 has a thickness of 20 μm.

Furthermore, the substrate 31 is provided with electrodes 30A and 30B, and conductive members 29A and 29B are provided on the electrodes 30A and 30B, respectively. A thickness, in a front-back direction, of the conductive members 29A and 29B embedded in the touch switch 25 is about 3 mm.

In FIG. 6, first, an activation process of the microcomputer 10 is performed, and when a change in capacitance is detected by the electrode 30 in step S3 (step S1), the microcomputer 10 determines, in the following step S2, whether a detected value of the capacitance is greater than a predetermined threshold or not (step S2).

In the case where the detected value of the capacitance is greater than the predetermined threshold (in the case where Yes is determined in step S2), the microcomputer 10 performs a process according to the detection result (step S3). Then, the microcomputer 10 repeats the process in step S1 (step S1).

On the other hand, in the case where the detected value of the capacitance is at or below the predetermined threshold (in the case where No is determined in step S2), the microcomputer 10 repeats the process in step S1 (step S1).

In FIG. 7, (A) and (B) are each an example of a graph showing a change over time in a detected value of capacitance detected by the corresponding one of the two adjacent electrodes 30A and 30B of a conventional touch switch 25.

Here, horizontal axes in (A) and (B) in FIG. 7 indicate time, and vertical axes indicate a size of a detected value of capacitance detected by the electrode 30 (in arbitrary unit).

As shown in (A) and (B) In FIG. 7, according to the conventional touch switch 25, when a finger of a user touches the touch switch 25, a change in capacitance is only detected by the corresponding electrode 30A, but a change in capacitance is possibly also detected by the adjacent electrode SOB due to coupling of capacitance with the fingertip. Such a tendency is conspicuous especially in the case of thick, large glass, and may result in an erroneous operation.

In a case where a capacitive switch is mounted by using thick glass 26, when a user presses a glass surface of the touch switch 25 with a finger, as shown in FIG. 8A, coupling of capacitance may be caused not only with the electrode 30A under the glass surface but also with the adjacent electrode 30B.

Also, as shown in FIG. 8B, in the thick glass 26, sensor sensitivity may be reduced due to coupling of capacitance between the adjacent electrodes 30A and 30B.

Accordingly, when the thick glass 26 is used for the touch switch 25, erroneous operations not intended by a user often occur.

Therefore, conventionally, to prevent such erroneous operations due to coupling of capacitance with the adjacent electrode 30B, and to correctly determine that the electrode 30A is selected by a user, complex analysis of a change in capacitance is often required, and there is a problem that power is consumed more than necessary.

Results of measuring a change in capacitance by using the touch switch 25 of the present invention are shown in FIG. 9.

In FIG. 9, (A) and (B) are each an example of a graph showing a change over time in a detected value of capacitance detected by the corresponding one of the two adjacent electrodes 30 of the touch switch 25 of the present invention.

Here in FIG. 9, a horizontal axis of (A) and (B) indicates time, and a vertical axis indicates a size of a detected value of capacitance (in arbitrary unit).

In FIG. 9, in a period 1, a user touched, with a finger, a glass surface, of the touch switch 25, corresponding to only one of the electrode 30A and the electrode 30B, and in a period 2, the user touched, with a linger, a glass surface, of the touch switch 25, corresponding to both the electrode 30A and the electrode 30B.

As shown in (A) and (B) in FIG. 9, in the period 1, when the finger of the user touched the glass surface, of the touch switch 25, corresponding to the electrode 30A, and a change in capacitance was detected by the electrode 30A, a change in capacitance was not detected by the adjacent electrode 30B.

Moreover, when the finger of the user touched the glass surface, of the touch switch 25, corresponding to the electrode 30B, and a change in capacitance was detected by the electrode 30B, a change in capacitance was not detected by the adjacent electrode 30A.

Furthermore, in the period 2, when the finger of the user touched the glass surface, of the touch switch 25, corresponding to both the electrode 30A and the electrode 30B, a change in capacitance was detected by both the electrode 30A and the electrode 30B.

A reason of such an improvement is considered to be as follows; as shown in FIG. 10, because a straight route RT1 connecting the finger touching the glass surface, of the touch switch 25, corresponding to the electrode 30A and the adjacent electrode 30B is interrupted by an air gap between the two electrodes 30A and 30B, the finger and the electrode 30B have to be coupled through a longer route RT2, causing coupling strength of capacitance to be reduced.

Also, unlike in a case of direct coupling of the planar electrodes 30A and 30B, the conductive members 29A and 29B are three-dimensionally structured with a thickness in the front-back direction. Considering that relative permittivity of air is about 1.00058 and relative permittivity of glass is about 3.5 to 9.9, contribution of capacitance from a side surface of the conductive member 29B cannot be completely ignored, and a possibility of contribution of direct coupling of capacitance between the finger and an upper surface of the conductive member 29B being reduced by the amount of contribution mentioned above is also conceivable as one factor.

Second Embodiment

Next, a touch switch 25 of an image display device 100 according to a second embodiment of the present invention will be described with reference to FIGS. 11, 12A and 12B.

Figure 11:
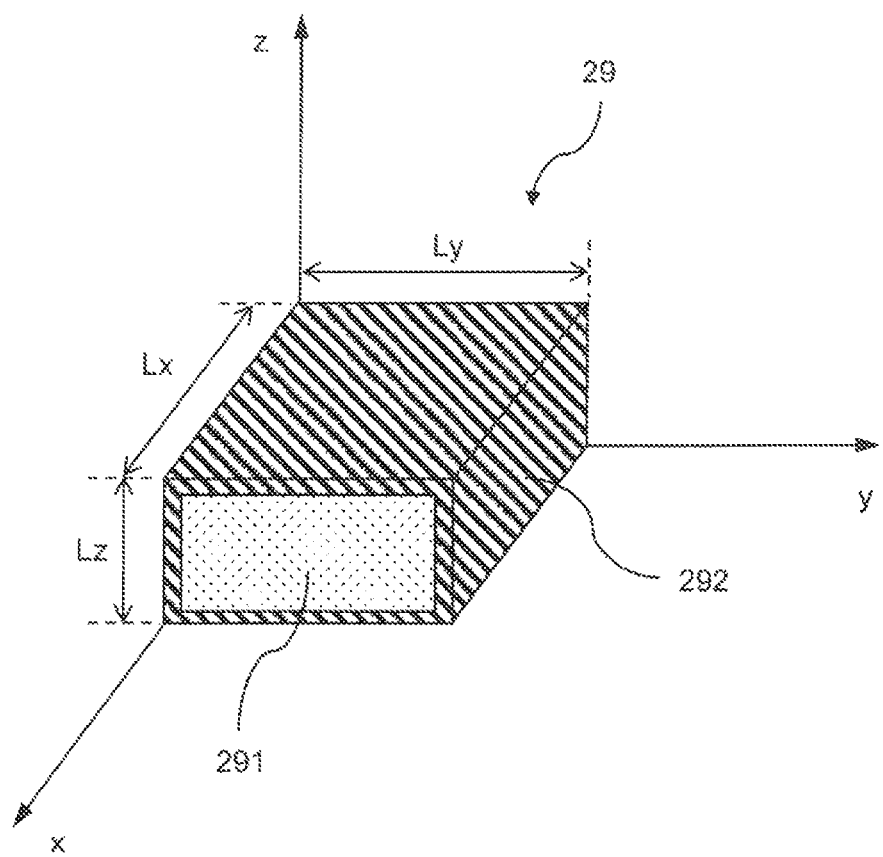
FIG. 11 is a perspective view of the conductive member of the touch switch according to the second embodiment.

FIG. 11 is a perspective view of the conductive member 29 of the touch switch 25 according to the second embodiment, FIGS. 12A and 12B are explanatory diagrams showing an example of installation of the conductive member 29 shown in FIG. 11 on the touch switch 25.

As shown in FIG. 11, the conductive member 29 is formed, from an elastic member 291 on an inside, and a conductive sheet 292 provided to a peripheral surface of the elastic member 291.

As shown in FIG. 12A, when, the conductive member 29 is installed on the electrode 30, and then the operation panel unit 251 is pushed toward the substrate 31, the conductive member 29 is deformed under a pressure from the substrate 31 and the operation panel unit 251.

As shown in FIG. 12B, at this time, the conductive member 29 is contracted in a direction of an arrow DA, and also expanded in directions of arrows RA and LA.

However, the conductive member 29 does not expand in a direction of a surface where the conductive sheet 292 is not wound.

This is because the conductive sheet. 292 has no elasticity or has only small elasticity, and elasticity of the elastic member 291 may be controlled by attaching such conductive sheet 292 on a specific surface of the elastic member 291.

For example, in a case where the conductive sheet 292 is wound around the elastic member 291 in a manner shown in FIG. 11, the conductive member 29 is prevented from being deformed by expanding in an x-direction. This is because a length Lx of the conductive sheet 292 in the x-direction is maintained constant.

On the other hand, with respect to deformation of the conductive member 29 in a y-direction, the conductive member 29 is allowed to be deformed to expand in the y-direction under a condition that a circumferential length 2Ly+2Lz of the conductive sheet 292 stay s constant.

As described, above, the conductive member 29 which expands only in a predetermined direction under pressure from the substrate 31 and the operation panel unit 251 may be realized.

Third Embodiment

Next, a touch switch 25 of an image display device 100 according to a third embodiment will be described with reference to FIGS. 13 and 14.

Figure 13:
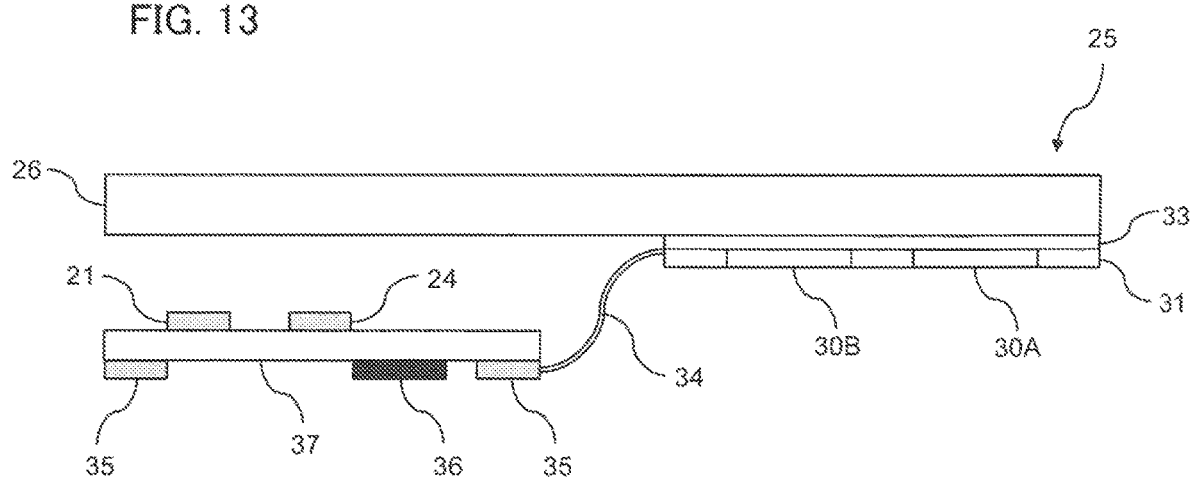
FIG. 13 is an explanatory diagram showing a structure of a conventional touch switch.

FIG. 13 is an explanatory diagram showing a structure of a conventional touch switch 25. FIG. 14 is an explanatory diagram showing a structure of the touch switch 25 according to the third embodiment.

In a case of providing the light receiving unit 21 and the indicator lamp 24 to a conventional touch switch 25, because these elements cannot be directly bonded to the glass 26, a two-part structure, as shown in FIG. 13, including the substrate 31 for the electrodes 30 and a control board 37 is adopted.

In FIG. 13, the substrate 31 including the electrodes 30A and 30B is bonded to the glass 26 by an adhesive layer 33, and is coupled with the control board 37 through a cable wire 34.

The control board 37 is provided with the light receiving unit 21 and the indicator lamp 24 on a front surface facing the glass 26, and is provided with a connector 35 and a control device 36 on a rear surface.

However, according to such a configuration, there are problems that the cable wire 34 is susceptible to noise, and that a cost is increased.

Figure 14:
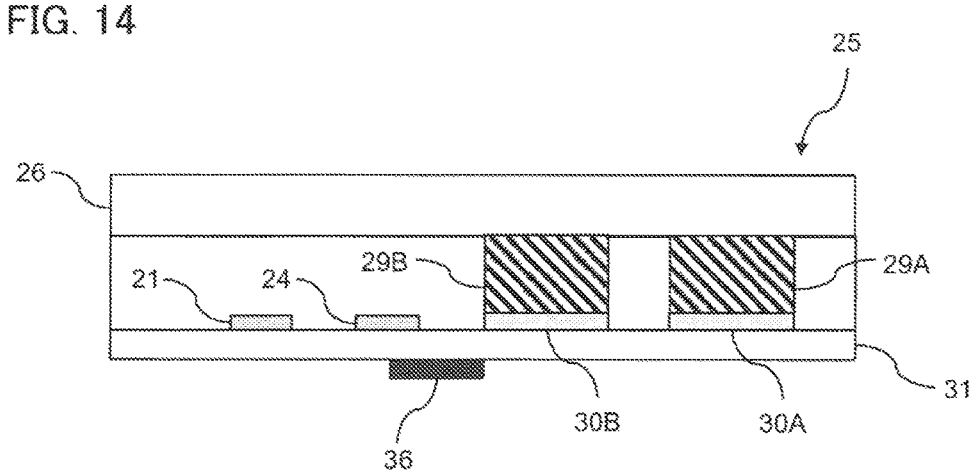
FIG. 14 is an explanatory diagram showing a structure of the touch switch according to the third embodiment.

Accordingly, to solve such problems, the light receiving unit 21 and the indicator lamp 24 are provided in a gap made by conductive-members 29 interposed between the glass 26 and the substrate 31, as shown in FIG. 14.

This secures a space for disposing the light receiving unit 21 and the indicator lamp 24, and eliminates a need to provide the unstable cable wire 34 between the substrate 31 and the control board 37, and thus sensitivity of the touch switch 25 is extremely enhanced.

Fourth Embodiment

Next, arrangement of a GND pattern 38 of a touch switch 25 of an image display device 100 according to a fourth embodiment of the present invention will be described with reference to FIGS. 15A, 15B, 16A and 16B.

FIGS. 15A and 15B are explanatory diagrams showing problems caused by providing the GND pattern 38 inside the touch switch 25. FIGS. 16A and 16B are explanatory diagrams showing a structure of the touch switch 25 according to the fourth embodiment.

As shown in FIG. 15A, the GND pattern 38 is sometimes provided on the substrate 31 so as to prevent influence of noise caused by coupling of capacitance with an adjacent electrode.

However, as shown in FIG. 15B, when the GND pattern 38 is provided near the conductive member 29, if the conductive member 29 contacts the electrode 30 and the GND pattern 38 and is short-circuited due to faulty installation of the conductive member 29 or the like, sensitivity of the touch switch. 25 may be reduced, or normal operation is disabled.

Accordingly, to prevent such problems, the GND pattern 38 is provided on a rear surface side of the substrate 31, as shown in FIG. 16A. In terms of relationship of lines of electric force, physical influence is small even if the GND pattern 38 is positioned on the rear surface side of the substrate 31.

Also, by disposing the GND pattern 38 in this manner, even if the conductive member 29 is horizontally shifted by an operation error or the like, as shown in FIG. 16B, inconveniences due to short-circuit caused by contact with the GND pattern 38 may be avoided.

Other Embodiments

1. In the first to the fourth embodiments, the conductive member 29 is not limited to have a cuboid shape, and may have a columnar shape, a semicircular column, shape, or a shape combining these shapes (fifth embodiment).

According to the above, an optimal conductive member 29 according to an area or a shape of the electrode 30 may be provided. 2, in the first to the fifth embodiments, the conductive member 29 may be an elastic body of rubber, resin or the like, or the elastic body itself may be conductive (sixth embodiment).

According to the above, an optimal conductive member 29 according to the structure of the touch switch 25 may be provided.

As described above, (i) an image display device of the present invention is an image display device including a capacitive touch switch that performs switching by detecting a finger based on a change in capacitance that is caused when the finger comes close to a panel, where the touch switch includes the panel, a substrate on which an electrode for detecting capacitance is mounted, and a conductive member corresponding to the electrode, and where the conductive member is provided between the panel and the electrode, and is fixed by being interposed between the panel and the electrode.

In the present invention, the "image display device" is a device for displaying an image/video, such, as a moving image, a still image or a 3D image, and includes a touch, panel which is operated by touching a screen with a fingertip or the like, and a touch switch for performing an operation for turning on or off power or for displaying a menu screen, based on a touch with a fingertip or the like on an operation panel, for example.

As the image display device, there may be cited a display of a television, a personal computer (PC), a public display, a monitor, an electronic blackboard, or the like.

Furthermore, the image display device is not limited to a stationary image display device, and may be a portable image display device such as a smartphone or a tablet terminal.

Furthermore, with respect to "when the finger comes close to a panel", the finger is not restrictive, and a tip of a pen may also be used, for example.

Moreover, preferred modes of the present, invention will be described.

(ii) The image display device according to the present invention may further include a capacitance detection sheet, where the panel has an area greater than the capacitance detection sheet, and the touch switch is disposed on a region, of the panel, other than a region of the capacitance detection sheet.

Accordingly, by configuring the touch switch by having a part of the panel used as a panel for the touch switch, the part of the panel may be effectively used, and also, because a capacitance detection sheet is not required by the panel for the touch switch, the cost may be greatly reduced. Also, assembly of the image display device with the touch switch is facilitated.

(iii) According to the image display device of the present invention, two or more of the electrodes may be mounted on the substrate, and the touch switch comprises conductive members corresponding to the electrodes, and each one of the conductive members may be provided between the panel and the corresponding one of the electrodes with a predetermined gap to another of the conductive members.

Accordingly, because each one of the conductive members is provided between the panel and the corresponding one of the electrodes with a predetermined gap to another of the conductive members, an image display device provided with a touch switch may be realized according to which coupling strength of capacitance between the electrodes is reduced and occurrence of an unintentional erroneous operation which is caused by coupling of capacitance inside the panel may be prevented by a simple and inexpensive structure.

(iv) According to the image display device of the present invention, the conductive member may be deformed in a predetermined direction under pressure from the panel and the electrode, when provided between the panel and the electrode.

Accordingly, by using the conductive member that is deformed in a predetermined direction under pressure from the panel and the electrode, unintended contact between the conductive member and another electrode, element or the like due to deformation of the conductive member may be prevented at the time of fitting the conductive member between the panel and the substrate.

(v) According to the image display device of the present invention, each one of the conductive members may be disposed on the substrate along a direction in such a manner that another of the conductive members is not positioned in a direction in which the each one of the conductive members become deformed under pressure from the panel and the corresponding one of the electrodes.

Accordingly, by determining the direction of the conductive member and disposing the conductive member, at the time of fitting the conductive member between the panel and the electrode, such that the other conductive member is not positioned in the direction of deformation of the conductive member, the conductive member may be prevented from, being deformed and contacting the other conductive member.

(vi) According to the image display device of the present invention, the conductive member may be formed by having a conductive sheet, wound around a predetermined surface of an elastic body having a cuboid, columnar or semicircular column shape, or a shape combining the shapes, and the elastic body may include at least one of urethane foam, rubber and resin, and be fixed between the panel and the electrode under pressure from the panel and the electrode.

Accordingly, the conductive member which is deformed in a specific direction, may be easily realized simply by having the conductive sheet wound around the elastic body.

(vii) According to the image display device of the present, invention, a ground pattern for preventing noise from, outside to the electrode may be provided on a surface, of the substrate, opposite a surface where the electrode is provided.

Accordingly, by providing the ground pattern on the substrate, on the opposite side from the electrode, the conductive member is prevented from, being in contact with, the ground pattern for guarding and being short-circuited even if the conductive member is disposed shifted from the electrode by an operation error or the like.

(viii) According to the image display device of the present invention, when the conductive member is provided between, the panel and the electrode, a gap of a predetermined size may be created between the panel and the substrate, and an element may be provided on the substrate with the gap.

Accordingly, by disposing an indicator LED and an IR light receiving unit in the gap between the panel and the corresponding substrate, a sensor board, and a control board do not have to be separated, and sensitivity is enhanced by eliminating unnecessary cable wires, which are unstable, and also, because a sensor sheet becomes unnecessary, costs for mold, mouse and the like may be reduced.

The preferable aspects of the present invention include the one formed by combining some of the above-mentioned plural aspects.

Besides the above-mentioned embodiments, various modifications for the present invention are possible. These modifications should not foe construed as not belonging to the scope of the present invention. The accompanying claims and their equivalents are intended to cover such forms or modifications as would fail within the scope of the invention.

What is claimed is:

1. An image display device comprising a capacitive touch switch that performs switching by detecting a finger based on a change in capacitance that is caused when the finger comes close to a panel,
   wherein the touch switch comprises the panel, a substrate directly on which an electrode for detecting capacitance is mounted, the electrode being mounted on a side of the substrate that faces the panel, and a conductive member corresponding to the electrode,
   wherein the conductive member is provided between the panel and the electrode, and is fixed by being deformed in a predetermined direction under pressure from the panel and the electrode regardless of the finger coming close to or touching the panel, and
   wherein the conductive member electrically connects the panel and the electrode.

2. The image display device according to claim 1, further comprising a capacitance detection sheet,
   wherein the panel has an area greater than the capacitance detection sheet, and the touch switch is disposed on a region of the panel other than a region of the capacitance detection sheet.

3. The image display device according to claim 2,
   wherein two or more of the electrodes are mounted directly on the substrate, and the touch switch comprises conductive members corresponding to the electrodes, and
   wherein each one of the conductive members is provided between the panel and the corresponding one of the electrodes with a predetermined gap to another of the conductive members.

4. The image display device according to claim 1,
   wherein two or more of the electrodes are mounted directly on the substrate, and the touch switch comprises conductive members corresponding to the electrodes, and
   wherein each one of the conductive members is provided between the panel and the corresponding one of the electrodes with a predetermined gap to another of the conductive members.

5. The image display device according to claim 4,
   wherein each one of the conductive members is disposed on the substrate along a direction in such a manner that another of the conductive members is not positioned in a direction in which the each one of the conductive members become deformed under pressure from the panel and the corresponding one of the electrodes.

6. The image display device according to claim 1,
   wherein the conductive member is formed by having a conductive sheet wound around a predetermined surface of an elastic body having a cuboid, columnar or semicircular column shape, or a shape combining the shapes, and the elastic body includes at least one of urethane foam, rubber and resin, and is fixed between the panel and the electrode under pressure from the panel and the electrode.

* * * * *